United States Patent Office 2,986,636
Patented May 30, 1961

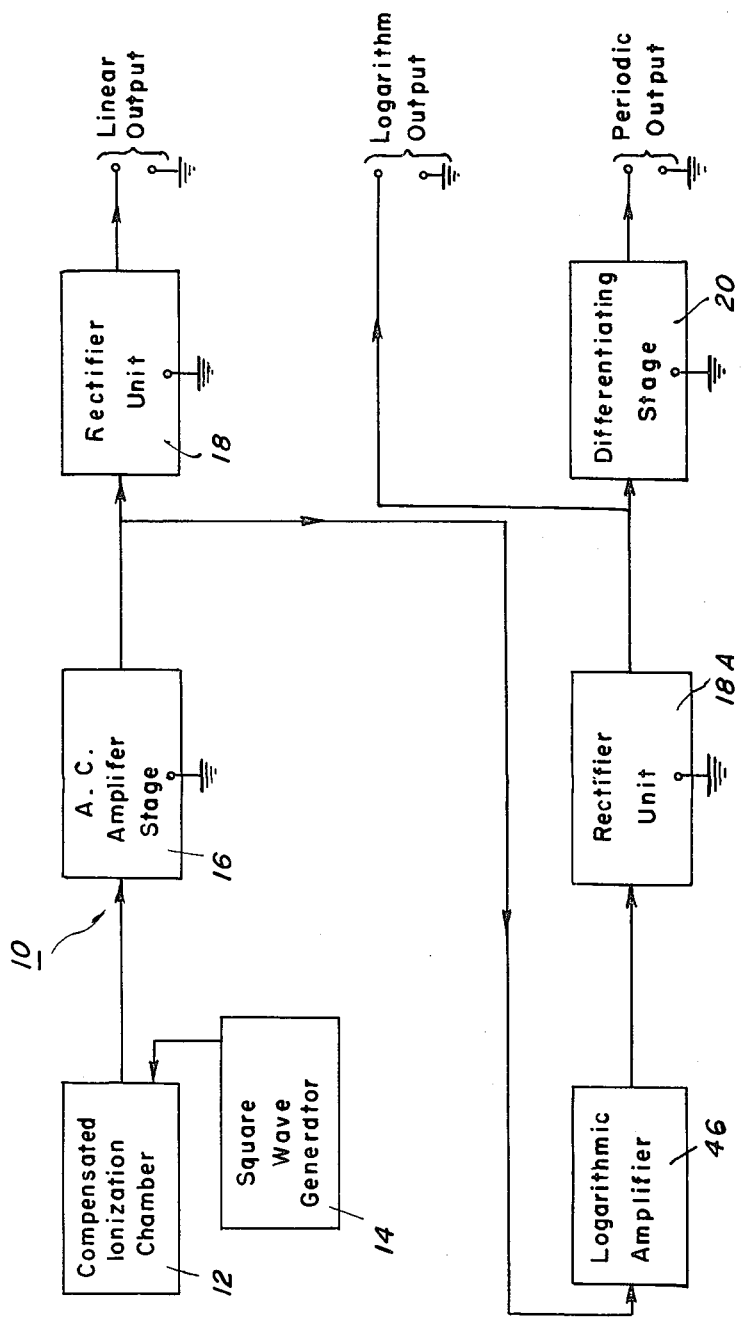

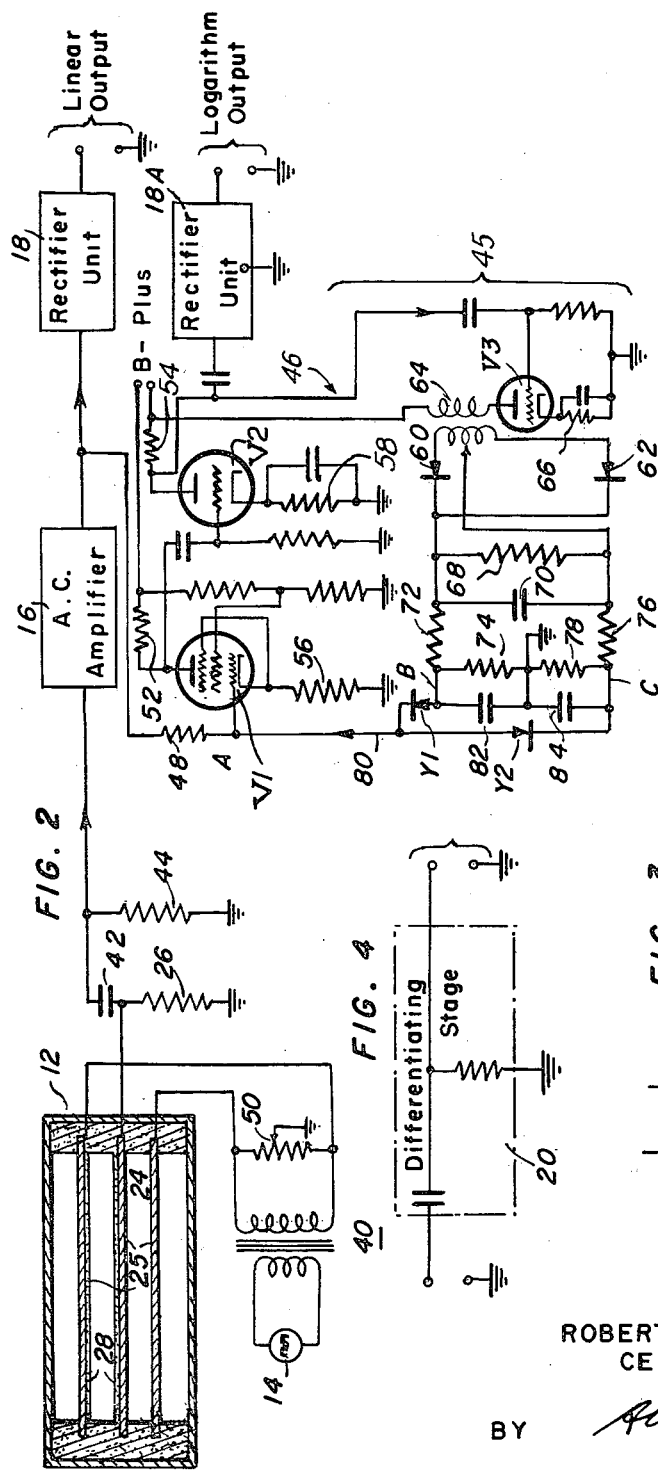

2,986,636

LINEAR AND LOGARITHMIC AMPLIFIERS FOR COMPENSATED IONIZATION CHAMBERS

Robert L. Carlson, Fullerton, and Cecil A. Crafts, Pasadena, Calif., assignors to Robertshaw-Fulton Controls Company, Richmond, Va., a corporation of Delaware Filed Aug. 15, 1957, Ser. No. 678,363

9 Claims. (Cl. 250—83.1)

This invention relates to nuclear instrumentation and more particularly to novel electronic measuring circuitry for use in conjunction with compensated ionization chambers.

The use of compensated ionization chambers is well known in the art of nuclear instrumentation. These chambers employ a plurality of electrodes which are so disposed as to form at least two closed compartments which are filled with an ionizable gas. One of the compartments is sensitized to neutron radiation by employing a neutron reactive coating such as boron on the enclosing surfaces thereof. The electrode which is common to both compartments is usually designated as a collector electrode and is returned to ground through a resistor, herein called the subtraction resistor. The electrodes on opposite sides of this collector electrode are conventionally energized with D.C. voltages of opposite polarity, thus causing the ionization currents developed in the two compartments of the chamber to flow through the subtraction resistor in opposite directions. Since the two compartments are made to have equal responses to gamma radiation, the net voltage developed across the subtraction resistor due to gamma ionization currents is zero. However, any neutron radiation impinging on the chamber will cause ionization only in the sensitized compartment via the sensitizing agent, and a net current through the subtraction resistor results. This current is in general of very small magnitude and requires amplification.

Many of the schemes currently in use for amplifying this small current suffer serious disadvantages. For instance, a common drawback in this type of instrumentation is drift in the amplifiers. D.C. amplifiers form one of the most difficult types of equipment for eliminating such drift. In order to obtain drift-free operation in connection with nuclear instrumentation circuitry, it would be highly advantageous to eliminate altogether the use of D.C. amplifiers.

The present invention contemplates novel combinations of circuitry and components which entirely eliminate the use of such drift-prone units as D.C. amplifiers. Moreover, by employing the embodiments of the present invention, there is provided substantially drift-free measuring circuitry capable of providing either linear or logarithmic amplification of the output signal developed by a compensated ionization chamber. The capacity of the invention for exploiting this amplified signal will become apparent as the specification proceeds.

In the present invention, method and means are disclosed for applying square wave excitation potentials to a compensated ionization chamber. Thus, electrodes on opposite sides of the collector electrode are subjected to square wave potentials of opposite phase, and sufficient magnitude to exceed the saturation potentials of the respective compartments of the ionization chamber. As a result, the differential signal which proportionately reflects the neutron radiation level is developed across the subtraction resistor in the form of a square wave having a peak-to-peak amplitude which is double the magnitude of the D.C. signal obtainable from an ionization chamber by normal excitation techniques. This, of course, has the effect of doubling the sensitivity of the ionization chamber. The use of substantially drift-free A.C. amplifiers which give either linear or logarithmic response is made practicable by thus eliminating the necessity for a continuous current output signal from the ionization chamber.

Accordingly, therefore, a primary object of the present invention is to double the sensitivity of a compensated ionization chamber and eliminate drift by rendering practicable the use of A.C. amplifiers.

Another object of this invention is to apply square wave excitation potentials to an ionization chamber to render possible the use of A.C. amplifiers.

A further object of this invention is to utilize the output signal of an amplifier as a logarithmic function of the input signal.

These and other objects and advantages of the present invention will become apparent by referring to the following detailed description and drawings in which like numerals indicate like parts and in which:

Fig. 1 illustrates in block diagram form the scheme of circuitry and interconnections to produce the three outputs of this invention;

Fig. 2 shows schematically the circuitry employed and includes the details of the logarithmic amplifier;

Fig. 3 shows a plot of the variations in current and impedance which characterize the nonlinear diode elements employed in the feedback loop for the logarithmic amplifier illustrated schematically in Fig. 2;

Fig. 4 shows diagrammatically a differentiating stage which may be utilized in practicing the invention in order to provide nuclear period information; and Fig. 5 is a modified embodiment of the ionization chamber shown in Fig. 2.

Turning now to the drawings, and more particularly to Fig. 1 thereof, the numeral 10 indicates generally the circuitry and interconnections utilized according to the present invention in selectively producing the linear, logarithmic, and periodic output signals referred to immediately above. More particularly, the circuitry 10 includes a compensated ionization chamber 12 which is supplied with operating potential by a square wave generator 14. Because of the use of the square wave generator 14, the ionization chamber produces an A.C. output signal which is proportional to the level of neutron radiation impinging upon the chamber. The exact manner by which this is accomplished will be explained shortly, in connection with the detailed description of Fig. 2. It is sufficient for present purposes to state that the output signal takes the form of a square wave, with successive amplitudes which reflect the level of the incident neutron radiation.

The square wave output signal produced by the compensated ionization chamber is applied to an A.C. amplifier stage 16. The stage 16 must be characterized by extremely low input grid current and high input impedance, and must be capable of developing an enlarged accurate reproduction of the input waveform. After a predetermined degree of amplification within the amplifier stage 16, the enlarged output square wave thus developed may be applied to a rectifier unit 18.

The rectifier unit 18 may comprise any suitable type of conventional full wave rectifier which is characterized by the ability to transform a periodic electrical input signal into a unidirectional output voltage. Because of the fact that the input signal for the rectifier is in the form of a square wave, the output of the rectifier unit approximates very closely a pure unidirectional voltage of substantially constant amplitude, and requires little or no filtering. This has the highly beneficial effect of preserving the desirably short time constant of the system. It will now be seen that by using a square wave generator to energize the electrodes of a compensated ionization chamber, there is provided a D.C. output signal voltage which varies proportionately with the level of neutron radiation sampled by the ionization chamber.

For the purpose of explaining in greater detail the advantages resulting from the use of a square-wave generator, reference will now be made to the schematic diagram depicted in Fig. 2. In Fig. 2, the compensated ionization chamber 12 is drawn schematically, with the collector electrode 24 located between the outer electrodes 25. Directly beneath the ionization chamber 12 there is illustrated a square wave generator 14. The generator 14 is coupled to the opposite ends of the primary winding of a transformer 40. Across the secondary winding of the transformer 40 is a potentiometer 50 with the wiper grounded in order to facilitate balancing of the signal. The outer ends of the secondary winding of the transformer 40 are connected to the outer electrodes 25 of the ionization chamber 12.

In operation, the application of a square wave potential to the outer electrodes 25 of the ionization chamber 12 will result in these electrodes being oppositely polarized with respect to ground, each varying in polarity with the square wave. This causes a square wave current which is proportional to the level of the neutron radiation impinging on the chamber to flow through subtraction resistor 26. More particularly, neutron radiation which impinges on the chamber is absorbed by a neutron reactive boron coating 28 which is provided in the chamber. The coating 28 is applied to the oppositely disposed surfaces of the collector 24 and one of the electrodes 25. The neutron absorption by this boron coating produces alpha particles (according to the reaction

which ionize the gas contained in the sensitized compartment.

The ions thus formed are collected on the electrodes by virtue of the electric field present which results in a net current through the subtraction resistor 26. This current, of course, takes the form of a square wave.

If, during the operation of the chamber, gamma rays penetrate the walls and ionize the gas between the several electrodes, no net signal current will result in the subtraction resistor 26, since the two volumes are constructed to have equal sensitivity to gamma radiation, and the circuitry is connected to balance the signal from one against that from the other. In practice, the chamber will usually comprise several sets of these compartments in order to assist in making the gamma ray response of the two types equal.

The output voltage from the ionization chamber developed across resistor 26 as a result of square wave excitation, is in the form of a square wave. The output square wave thus developed possesses a peak-to-peak amplitude which is double the value of the D.C. output signal obtainable from an ionization chamber by conventional means. This means that the sensitivity of the present invention is superior to such conventional systems by a factor of 2.

The square wave output signal developed by the chamber 12 is applied, via coupling capacitor 42 and resistor 44 as an input signal to the grid of the A.C. amplifier stage 16. After suitable amplification, the square wave is applied to the rectifier unit 18, for full wave rectification therein. Because of the square waveform applied to the rectifier unit, the output signal which is thus developed comprises a substantially pure D.C. voltage which requires negligible filtering. This eliminates the necessity for disturbing the system time constant with conventional stages of filter circuitry. Thus, by utilizing square wave excitation potentials as taught in the present invention, there is provided a unidirectional output signal which exhibits a linear variation with the changes in the level of detected neutron radiation.

Continuing now with the detailed description and returning temporarily to Fig. 1, the numeral 12 has been used in this figure to indicate a compensated ionization chamber supplied with the required operating potential by means of a square wave generator 14.

The output square wave of the A.C. amplifier stage 16 is supplied to an ingenious logarithmic amplifier stage 46 which forms an integral part of this invention and is discussed more fully in connection with Fig. 2. It is sufficient for the purpose of explaining the block diagram shown in Fig. 1 to state that the amplifier stage 46 produces an output square wave which has an amplitude proportional to the logarithm of the neutron radiation level.

From the logarithmic amplifier stage 46, the amplified output square wave is applied to a rectifier unit 18A. The rectifier unit 18A may be of the same type as unit 18 and may similarly comprise any suitable type of full wave rectifier characterized by the ability to transform a periodic electrical input signal into a unidirectional output voltage.

Because of the fact that the output waveform from the stage 46 is in the form of an amplified square wave, the output developed by the rectifier unit 18A comprises a substantially constant amplitude D.C. voltage. Thus, by exploiting the embodiment of the invention illustrated in Fig. 1, there is provided a unidirectional output signal which exhibits a logarithmic variation with changes in the level of the incident neutron radiation. It will be appreciated in this connection that, if desired, the output of the rectifier unit 18A may be fed to the differentiating stage 20 shown in Fig. 1. By this means, a unidirectional signal proportional to the period of the reactor from which the neutrons emanate is made available for the subsequent stages of circuitry.

The method by which the present invention exploits a unique feedback loop acting in conjunction with a pair of nonlinear diodes will now be explained. In Fig. 2, the output signal of the compensated ionization chamber 12 is developed across the subtraction resistor 26.

Because of the use of the square wave generator 14 in providing operating potentials to the chamber 12, it will be recalled that the signal which appears across resistor 26 takes the form of a square wave having successive amplitudes which reflect the level of the incident neutron radiation.

The output of the A.C. amplifier stage 16 is coupled, via resistor 48, directly to the control grid of a conventional pentode tube V1. In order to expedite the detailed description, this point has been designated by the letter A in the drawing. The amplified signal appearing at the anode of tube V1 is capacitor-coupled directly to the control grid of a conventional triode tube V2. The respective anodes of the tubes V1 and V2 are connected to B-plus through suitable load resistors 52 and 54, respectively. The cathodes of tubes V1 and V2 are coupled to ground through suitable cathode bias resistors 56 and 58, respectively. It will be appreciated that the tubes V1 and V2 along with the components just described make up a conventional two-stage R-C coupled voltage amplifier. In practicing the invention, an overall gain of approximately 100 in this amplifier was found to yield excellent results.

In the special feedback loop for the logarithmic amplifier, B-plus plate potential is applied through the primary winding of a transformer 64 to a triode V3. The output voltage of the triode V2 (immediately above) is capacitor coupled to the control grid of the triode V3 to modulate the current conduction therethrough. The cathode of triode V3 is connected to ground through a conventional cathode biasing resistor 66.

The secondary winding of transformer 64 is provided with a tap connection and the opposite ends of the winding are connected in series through a pair of oppositely poled diodes 60 and 62. The diodes 60 and 62 may comprise conventional germanium or silicon diodes, or the like.

It will be observed that the feedback loop includes a resistor 68 connected between the tap connection of the secondary winding and the common junction between the oppositely poled diodes 60 and 62. A capacitor 70 is connected in parallel with the resistor 68. The common junction between one end of resistor 68 and one plate of capacitor 70 is coupled to ground, via series connected resistors 72 and 74. Conversely, the common junction between the opposite end of resistor 68 and the other plate of capacitor 70 is coupled to ground, via series connected resistors 76 and 78. The junction B between resistors 72 and 74 is connected to the anode end of a diode $Y_1$. Conversely, the junction C between resistors 76 and 78 is connected to the cathode end of a diode $Y_2$. The cathode end of diode $Y_1$ is interconnected to the anode end of $Y_2$ and the common connection thus formed is coupled directly to the control grid of pentode $V_1$, shown immediately above, by means of a conductor 80.

The resistor 74 is shunted by a parallel connected capacitor 82, and resistor 76 is shunted by a parallel connected capacitor 84. This, of course, places the common junction between the plates of capacitors 82 and 84 at ground potential.

In appreciating the operation of the feedback loop 45, it should be observed that the square wave output voltage from the triode V2 is applied directly to the control grid of triode V3 and again amplified therein. Within the network which includes the diodes 60 and 62, resistors 72, 74, and 76, 78, and the component capacitors, the square wave voltage appearing at the anode of V3 is rectified and filtered.

With respect to the contribution of the diodes $Y_1$ and $Y_2$ in this network, reference will now be made to Fig. 3. The plot of the forward voltage versus diode current is observed to follow a characteristic exponential or logarithmic variation over a considerable range. The corresponding inverse plot of diode forward impedance against forward voltage also emphasizes the obvious logarithmic relationship between these variables.

It will be appreciated in practicing the invention, the value of the impedances of the parallel connected resistor 74—capacitor 82 and resistor 78—capacitor 84 networks are proportionately small compared to the impedance of diodes $Y_1$ and $Y_2$, respectively, at the desired operating frequency and operating point on the curve of Fig. 3. Additionally, the use of a resistor 48 having an ohmic value slightly less at zero bias voltage than the impedance to ground from point A was found desirable in practicing the invention.

For these conditions, it will be apparent that the network comprising diodes $Y_1$, $Y_2$ and capacitors 82, 84 provides a balanced path to ground to prevent the square wave voltage appearing at the anode of tube $V_3$ from appearing at point A, the control grid of tube $V_1$. Thus, for any given signal applied to point A, the voltage at point B will be the same amount positive with respective ground as is the voltage at point C negative with respect to ground, to produce a net D.C. voltage of zero at point A. It will be appreciated that the effect of the D.C. feedback voltage varies the A.C. impedance from point A to ground. Thus, the resistor 48 in conjunction with the varying impedance produced by the diodes $Y_1$, $Y_2$ constitutes an attenuator circuit and a plot of the impedance to ground from point A in the feedback circuit will substantially follow the plot of forward impedance versus forward voltage shown in Fig. 3, and exhibit the same logarithmic law of variation between the variables. The value of D.C. voltage developed across points B and C will, of course, exhibit a linear relationship with the periodic output square wave signal appearing at the input control grid to the triode V3. This signal, of course, comprises the output signal of the R.C. coupled voltage amplifier shown immediately above.

Because of the reduced value of resistor 48 with respect to the impedance of point A to ground, and the linear relationship obtaining between the above mentioned D.C. voltage and the output signal of the amplifier, linear increases in the amplifier output signal can be obtained only by logarithmic increases in the amplitude of the input voltage supplied the amplifier. In order to maintain linearity, the signal amplitude at point A should be small compared to the amplitude of the maximum bias voltage developed at the points B and C. In practicing the invention, a ratio of 1 to 100 between these amplitudes was found to yield excellent results.

It will now be appreciated that with the embodiment of the invention shown in Fig. 2, the output signal of the R-C coupled voltage amplifier comprises a square wave having an amplitude proportional to the logarithm of the neutron radiation level sampled by the ionization chamber. Because of this characteristic square wave shape, the rectifier unit 18A is able to produce a very nearly constant amplitude unidirectional voltage. As earlier explained in this specification, the differentiating stage 20 may be fed by the output of the rectifier unit 18A. The differentiated signal thus developed then is made available for subsequent stages of the circuitry.

It should be appreciated that the tendency of the logarithmic amplifier to behave as a linear amplifier at small input levels before the diodes take effect makes it possible to extend the usable range of the system. For instance, two or more of the logarithmic amplifiers may be connected in tandem, so that only one of the amplifiers is providing a logarithmic response at any one time.

The means and devices comprised in the present invention are equally applicable to conventional non-compensated ionization chambers of various designs if a capacitor is utilized to simulate the "missing" compartment of the chamber. This principle is illustrated in Fig. 5, in which a variable capacitor 86 and a conventional ionization chamber 88 are interconnected to form the electrical equivalent of a compensated ionization chamber. In order to accomplish this, the variable capacitor 86 is adjusted to the same value of capacity as that which exists between the collector 90 and the high voltage electrode 92 of the chamber. The conductors 93 are, of course, connected to a source of square wave excitation in exactly the same manner as explained in connection with the compensated ionization chamber shown in Fig. 2. The ionization chamber 88 may then be utilized with the circuitry of the present invention for the detection of alpha, beta, gamma or neutron radiation, and the ionization current thus developed can be amplified and operated upon by any of the various embodiments described above.

It will be apparent to those skilled in the art that many modifications of the disclosed embodiment of this invention may be made without departing from the scope thereof which is to be measured by the appended claims.

We claim:

1. In a circuit for utilizing the electrical signals produced by incident sub-atomic radiation, a compensated ionization chamber having plural electrodes therein, means including a square wave voltage generator connected to provide a saturation potential of one polarity with respect to ground to at least one of said electrodes and a saturation potential of the opposite polarity with respect to ground to at least one other of said electrodes, and means including an A.C. amplifier stage connected to receive from said ionization chamber a square wave output signal having successive amplitudes proportional to the level of the incident neutron flux.

2. In a circuit for producing electrical signals related to incident sub-atomic radiation, a gas-filled ionization chamber provided with at least three electrodes disposed to define at least two separate compartments, means including a square wave voltage generator connected to energize a pair of said electrodes with potentials oppositely polarized with respect to a third electrode, a grounded subtraction resistor connected to said third electrode, linear amplifier means connected to sample and amplify the output square wave signal from said chamber developed across said subtraction resistor, and means including a rectifier unit connected to receive said amplified square wave signal and develop a unidirectional voltage having a magnitude proportional to the incident neutron intensity therefrom.

3. In a feedback loop for a logarithmic vacuum tube amplifier, a triode tube connected to receive and amplify the output signal developed by said amplifier, a transformer provided with a tapped secondary winding and a primary winding interconnected in the anode line of said triode, a pair of oppositely poled nonlinear diodes connected in series with said secondary winding, a parallel-connected resistor and capacitor connected between the tap on said secondary winding and the common junction between said diodes, a first pair of series-connected resistors connected between one plate of said capacitor and ground, a second pair of series-connected resistors connected between the opposite plate of said capacitor and ground, a second capacitor connected between ground and the common junction between said first pair of resistors, a third capacitor connected between ground and the common junction between said second pair of resistors, a pair of oppositely poled series connected diodes coupled in shunt across said second and third capacitors between the common junctions between said first and second pairs of resistors, and conductor means effectively coupling the junction point between said oppositely poled diodes back to the input of said logarithmic vacuum tube amplifier.

4. In a feedback loop for a logarithmic vacuum tube amplifier, a plural element space discharge device connected to sample and amplify the output signal developed by said amplifier, plural winding inductor means having a first tapped winding and a different winding connected in the anode line of said discharge device, a first pair of oppositely poled and commonly connected diodes connected in series with said different winding, a parallel connected resistor and capacitor coupled between the tap on said first winding and the common connection between said first pair of diodes, a group of four series connected resistors connected to ground at the electrical midpoint and coupled in parallel across the plates of said capacitor, a pair of capacitors connected in parallel across the inner pair of resistors of said group of resistors and provided with a grounded common junction therebetween, a second pair of oppositely poled and commonly connected diodes connected across the inner pair of resistors of said group of resistors, and conductor means mounted to commonly connect the junction point between said second pair of diodes to the input grid of said logarithmic amplifier.

5. In a circuit for utilizing the electrical signals produced by intercepted sub-atomic radiation, a compensated ionization chamber having plural electrodes therein; means including a square wave voltage generator connected to provide a saturation potential of one polarity with respect to ground to at least one of said electrodes and a saturation potential of the opposite polarity with respect to ground to at least one other of said electrodes; an A.C. amplifier; an input circuit connected to receive an input signal from said ionization chamber and apply it to said amplifier, said input circuit including two oppositely polarized diodes; and means for applying the output of said amplifier to said diodes to alter the impedance of said diodes so as to cause said amplifier to provide a square wave output signal having an amplitude logarithmically related to the level of the incident neutron flux detected by said chamber.

6. In a circuit for utilizing the electrical signals produced by intercepted sub-atomic radiation, a compensated ionization chamber having plural electrodes therein; means including a square wave voltage generator connected to provide a saturation potential of one polarity with respect to ground to at least one of said electrodes and a saturation potential of the opposite polarity with respect to ground to at least one other of said electrodes; an A.C. amplifier; an input circuit connected to receive an input signal from said ionization chamber and apply it to said amplifier, said input circuit including two oppositely polarized diodes; means for applying the output of said amplifier to said diodes to alter the impedance of said diodes so as to cause said amplifier to provide a square wave output signal having an amplitude logarithmically related to the level of the detected neutron flux, and rectifier means connected to receive said square wave output signal and develop a unidirectional output waveform therefrom.

7. In a circuit for utilizing the electrical signals produced by an intercepted sub-atomic radiation generated by a nuclear reactor, a compensated ionization chamber having plural electrodes therein; means including a square wave voltage generator connected to provide a saturation potential of one polarity with respect to ground to at least one of said electrodes and a saturation potential of the opposite polarity with respect to ground to at least one other of said electrodes; an A.C. amplifier; an input circuit connected to receive an input signal from said ionization chamber and apply it to said amplifier, said input circuit including two oppositely polarized electrodes; means for applying the output of said amplifier to said diodes to alter the impedance of said diodes so as to cause said amplifier to provide a square wave output signal having an amplitude logarithmically related to the level of the incident neutron flux detected by said chamber; means connected to receive and rectify said square wave output signal; and means including a differentiating stage connected to receive said rectified signal and derive a unidirectional signal proportional to the period of said nuclear reactor.

8. In a logarithmic amplifier, the combination comprising an A.C. amplifier, an input circuit connected to said amplifier for receiving signals to be amplified and including plural diodes, and means for applying the output of said amplifier to said diodes to alter the impedance of said diodes so as to cause said amplifier to provide an output having an amplitude logarithmically related to the level of a signal applied to said input circuit.

9. In a logarithmic amplifier, the combination comprising an A.C. amplifier, an input circuit connected to said amplifier for receiving signals to be amplified and including two oppositely poled diodes, and means for applying the output of said amplifier to said diodes to alter the impedance of said diodes so as to cause said amplifier to provide an output having an amplitude logarithmically related to the level of a signal applied to said input circuit.

References Cited in the file of this patent
UNITED STATES PATENTS

| | | |
|---|---|---|
| 2,470,224 | Scherbatskoy | May 17, 1949 |
| 2,480,808 | Fearon | Aug. 30, 1949 |
| 2,496,723 | Hipple | Feb. 7, 1950 |
| 2,506,435 | Rossi et al. | May 2, 1950 |
| 2,728,862 | De Bourgknecht | Dec. 27, 1955 |
| 2,756,345 | Replogle et al. | July 24, 1956 |
| 2,769,098 | Dunham | Oct. 30, 1956 |
| 2,818,504 | De Shong | Dec. 31, 1957 |
| 2,824,971 | Weeks | Feb. 25, 1958 |

OTHER REFERENCES

Ballantine: Electronics, vol. 2, January 1931, pp. 472, 473 and 490.